United States Patent [19]
Nahumi

[11] Patent Number: 5,754,534
[45] Date of Patent: May 19, 1998

[54] DELAY SYNCHRONIZATION IN COMPRESSED AUDIO SYSTEMS

[76] Inventor: Dror Nahumi, 49 Stonehenge Dr., Ocean, N.J. 07712

[21] Appl. No.: 643,547

[22] Filed: May 6, 1996

[51] Int. Cl.[6] ............................................. H04L 12/18
[52] U.S. Cl. ............................................. 370/261
[58] Field of Search ............................. 370/261, 389, 370/395, 428, 259, 260, 262, 263, 264, 279, 242, 241, 244, 247, 251, 216, 217, 219, 220, 225, 227, 228; 379/202; 348/415, 416, 412, 413

[56] References Cited

U.S. PATENT DOCUMENTS 5,390,177  2/1995  Nahumi .................................. 379/202
5,574,504  11/1996  Yagasaki et al. ...................... 348/415

*Primary Examiner*—Dang Ton
*Attorney, Agent, or Firm*—Charles I. Brodsky

[57] ABSTRACT

The apparatus of the invention eliminates objectionable popping and clicking when switching between conferees in a communications conferencing system employing signal compression techniques to reduce bandwidth requirements. The apparatus operates with the conventional audio decoder of such system, and with its conventional audio encoder of the type employing a look-ahead-buffer in converting a frame of sampled voice or data to a compressed bit stream. The apparatus of the invention employs its own audio decoder and audio encoder in broadcasting the digital signal samples to the various conferees on the system, but its audio encoder is devoid of any look-ahead-buffer, to achieve synchronization and time matching between the audio encoder delay and its relevant bit stream.

4 Claims, 3 Drawing Sheets

DELAY SYNCHRONIZATION IN COMPRESSED AUDIO SYSTEMS

FIELD OF THE INVENTION

This invention relates to providing conferencing capabilities for compressed audio signals and, more particularly, to the implementation of a conferencing arrangement for that described in my U.S. Pat. No. 5,390,177, which issued on Feb. 14, 1995.

BACKGROUND OF THE INVENTION

As is set forth in my above United States Patent, conferencing is the capability of coupling information signals among three or more users in a communications system— where signal compression techniques are often used to reduce bandwidth requirements for transmitting both voice and data. As is there described with audio signal conferencing, bridge techniques are employed where the compressed signals are first decompressed, then summed, and the sum then recompressed and broadcast to all conferees. As pointed out, the use of such serial connection of single encoders and decoders to respectively compress and decompress the audio signal degraded the resulting signal quality to a level that was determined to be objectionable to many conferees. As a result, a conferencing arrangement was developed which distinguished between one conferee speaking on a line at any one time with situations where there were more than one conferee speaking simultaneously. As disclosed there, when there was only one conferee speaking, the summer in the conference bridge was bypassed and that conferee's signal was then broadcast to all conferees; on the other hand, where there were more than one conferee speaking together, the signals of only those conferees who were speaking were routed to an associated speech decoder; then, the decompressed speech signals outputted by each decoder were summed, and the sum compressed again and broadcast to all of the conferees.

The end result, with my aforementioned invention, was the reduction of signal degradation associated with the tandeming of signal encoders and decoders, to permit the sharing of a smaller number of single decoders among a larger number of conferees. Simply stated, logic circuitry was described to detect when energy was present in only one lead, indicating only one talking conferee, to cause that conferee's compressed signal to be broadcast to all conferees without passing the speech decoder and encoder, and without passing through the summer. Conversely, the logic circuitry detected when there was more than one talking conferee at any given time, to respond to have those conferee's signals then coupled to the speech decoders wherein those conferee's compressed signals were decompressed. Problems arose, however, when trying to implement the teachings of my patent with the type of encoder prevalent in the technology to convert the non-compressed audio or video signal to a set of compressed parameters such as quantization indices called a bit stream. In particular, when using this technique to reduce the bandwidth required for signal transmission, audible popping was introduced wherever there was a transition from multiplexing to encoding-decoding, in going from one type to the other of the two broadcasting arrangements to the system conferees. That is, while the conferencing arrangements of my U.S. Pat. No. 5,390,177 satisfied the problems then being confronted, the implementation using available equipments introduced this disturbing sound whenever the conferencing switched from one person or persons, to another.

OBJECTS OF THE INVENTION

It is an object of the present invention, therefore, to determine the cause for introducing such signal distortion when switching amongst conferees in the compressed information signal transmission system environment.

It is another object of the invention to be able to correct such problem, in order that the conferencing arrangement for the compressed information signal environment of my patent can be fully utilized.

It is a further object of the invention to improve the overall performance of such communication systems when compressed signals are employed, and particularly when compressed audio signals are being transmitted in the conferencing system.

SUMMARY OF THE INVENTION

Pursuant to the present invention, it was first recognized that each conferee in the system employed a modem, personal computer or other terminal incorporating an audio encoder for compression, and a decoder for converting received information back to speech—which were not susceptible to modification. Based upon that understanding, the present invention recognizes that certain algorithmic changes are needed for the compression to offset the sound popping problem upon switching. As will become clear from the following description, the modification follows from an appreciation of the operation of a look-ahead buffer employed in the audio encoder.

BRIEF DESCRIPTION OF THE DRAWINGS

These and other features of the invention will be more clearly understood from a consideration of the following description, taken in connection with the accompanying drawing, in which.

DETAILED DESCRIPTION OF THE DRAWINGS

As is known, a typical audio encoder operates on a frame-by-frame basis, converting sampled speech to a set of quantization indices termed a bit stream. There, a frame of data (usually 10–30 millisecs of audio) is sampled and to that end a frame delay equal to the frame delay of the particular encoder is employed. Such frame delay is shown as 40 in FIG. 1.

A look-ahead-buffer 42 then receives the delayed speech in analyzing the information at the frame boundary, i.e. at the end of the frame boundary instead of information centered within the frame, in analyzing the spectrum component of the speech. Thus done at the end of the frame boundary, that frame based analysis, as at 44, adds a further delay to the speech signal coming in. Using the look-ahead-buffer 42, a slow time-variant parameter is thus calculated at the end of the frame boundary utilizing digital signal processing, oftentimes of linear prediction coefficient (LPC). Where the frame delay introduced at 40 is of the order on 20 millisecs, for example, the look-ahead-buffer 42 typically adds an additional 5 or 10 millisecs of further delay—and after processing through a second frame delay unit 46, it is compared to the bit stream at the end of the previous frame in an interpolator 48, where it is compared to the information from the end of the previous frame by linear interpolation. The output from the interpolator 48 is then coupled on to smaller subframe by subframe analysis in extracting further parameter information.

Figure 1:
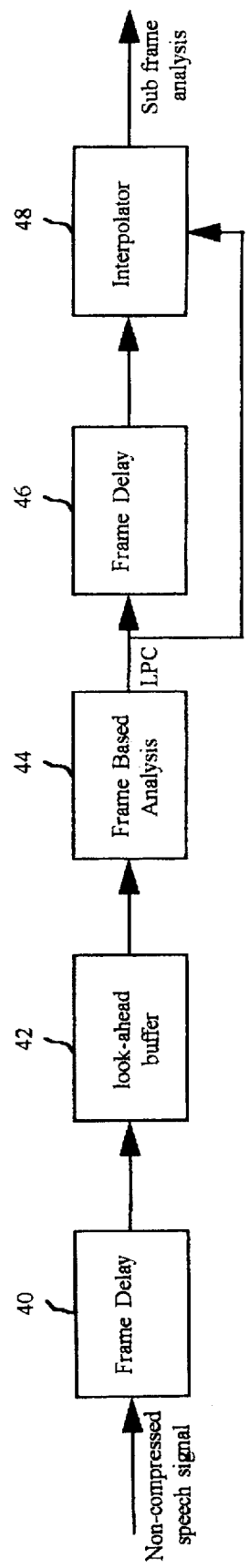
FIGS. 1 and 2 are helpful in understanding the operation of an audio encoder of a type widely used to convert non-compressed audio or video signals to a set of quantization indices, termed a bit stream.
Figure 2:
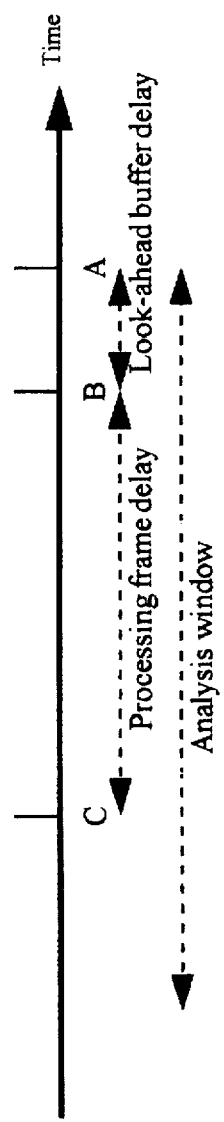

FIG. 2 illustrates these delays, with the time interval from A to B representing the look-ahead-buffer delay, with the time interval from B to C representing the processing frame delay, and with the time interval from A back towards D representing the analysis window. As will be appreciated, FIGS. 1 and 2 represent existing, standard, prior art audio encoders of a kind conforming to accepted cellular and other international standards.

Figure 3:
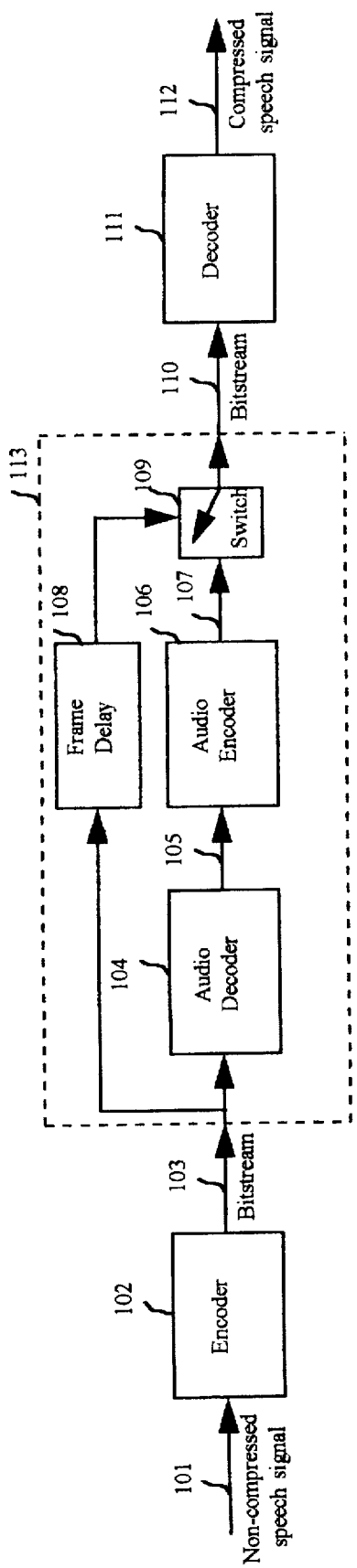
FIG. 3 illustrates this type of encoding as might be used in the conferencing arrangement of my aforesaid United States Patent, and is helpful in understanding the sound popping problem which arises when switching amongst system conferees.

FIG. 3 shows, in simplified form, a communication system using signal compression to reduce bandwidth requirements as employing an audio encoder 102 (operating as in accordance with the apparatus of FIGS. 1 and 2), and an audio decoder 111—each of which is already part of a compressed audio conferencing system. As will be appreciated, the speech or data signal is applied at 101, and is turned back to speech or data at 112.

As my U.S. Pat. No. 5,390,177 describes, circumstances arise where the connection from the encoder 102 to the decoder 111 is bypassed, as with a switch. Such an arrangement is described in my patent—and when employed with the type of encoder described here in FIG. 1, takes on the appearance as shown in FIG. 3. More particularly, the speech input at 101 is coupled through the audio encoder 102 to obtain the speech in compressed bit stream at 103, before being coupled by the system 113 to output at 110 before being coupled to the audio decoder 111 for turning back to speech at 112. With the system 113, as in my patent, another decoder-encoder function is required, as at 104 and 105—and to offset the delay of the coder associated with the look-ahead-buffer, a further frame delay is added at 108. In other words, with the conferencing bridge of my patent, where the audio signal 105 is summed with other non-compressed signals, a delay line equal to one frame of delay is required in order to keep the delay of the signal 110 constant. That frame delay, shown at 108, is then utilized in conjunction with the switch 109 when coupling the summed signal at 107 to the audio decoder 111. In this manner, the delay from the audio encoder 102 (at 103) to the output of the encoder 106 (at 107) is selected to equal the delay from the encoder 102 (at 103) to the input to the switch 109, after the frame delay 108. Since the processing frame size of the encoder 106 equals one frame, a delay line equal to one frame of delay is required at 108 in order to keep the delay of the signal 110 constant.

However, when implementing this arrangement, sound popping resulted when the conferencing system was switched from when only one conferee was speaking, to when more than one conferee were speaking simultaneously. Further analysis revealed that this was in part due to the fact that the compressed bit stream is framed once per processing frame, so that it is possible to delay it only by multiples of the processing frame delay. It was also found that with the type of look-ahead-buffer 42 as employed in the encoder, problems arose because its delay was typically shorter than that of the processing frame delay. Significant noise was thus heard in the output speech signal at 112. In other words, where the frame size was 20 millisecs, for example, the extra look-ahead delay of 5 or 10 millisecs in the encoder 106 only gives rise to the problem happening. Further analysis revealed that the problem arose because of the use of the look-ahead-buffer 42, which is typically a fraction of the frame size. Due to the misalignment in the delay between the signals 107 and 108, pops and clicks resulted in the audio output.

Figure 4:
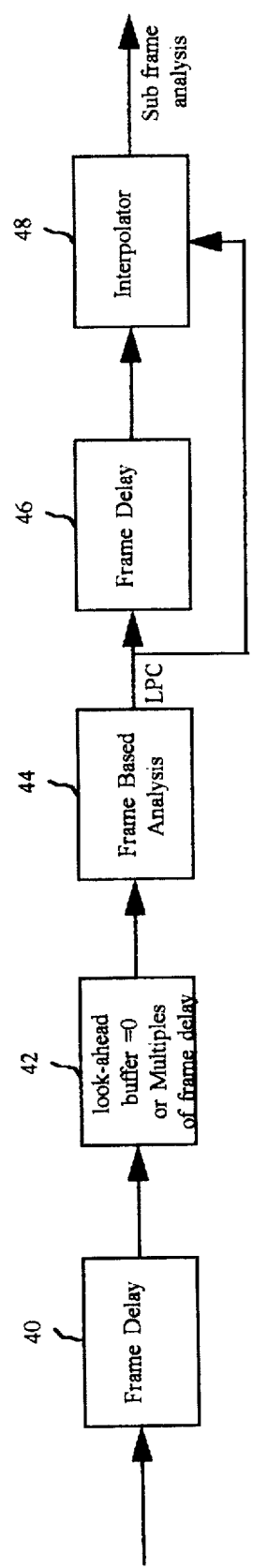
FIG. 4 shows a modified audio encoder embodying the invention to obviate the sound popping problem upon switching when employed in the conferencing arrangement of FIG. 3.

The configuration of FIG. 4 follows from the realization of the cause of the problem, and the need to eliminate the use of the look-ahead-buffer 42. In that way, the delays can be synchronized to be made equal and constant. But, as the encoder and decoder at the user terminals are standardized and fixed, all that can be changed is the system 113, which effectively is accomplished by modifying the audio encoder 106, in making it different from the encoder 102.

Thus, and as will be understood, the audio encoder 106 will then take on the form shown in FIG. 4—which is analogous to that of FIG. 1, except in its elimination of the look-ahead-buffer (denoted as "look-ahead-buffer=0").

Figure 5A:
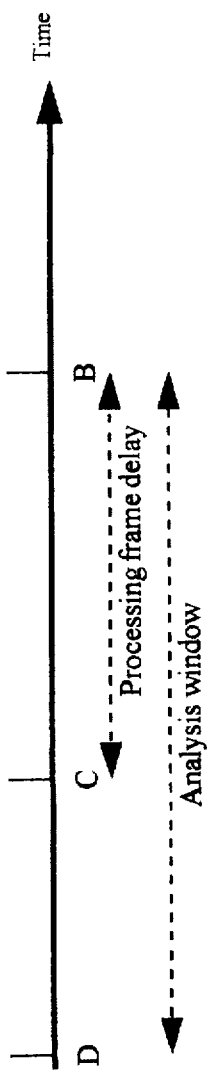
FIGS. 5A, 5B and 6 represent analysis windows helpful in an understanding of the improvement of the invention.

With such modification, the coder delay of FIG. 2 is likewise modified, to appear at FIG. 5A, where the processing time delay extends from B to C, and the analysis window extends from B back towards D. Although some quality is lost because the analysis begins from point B in FIG. 5A, instead of from Point A in FIG. 2, the overall system operation has been noted to improve, by eliminating the pops and clicks.

Figure 6:
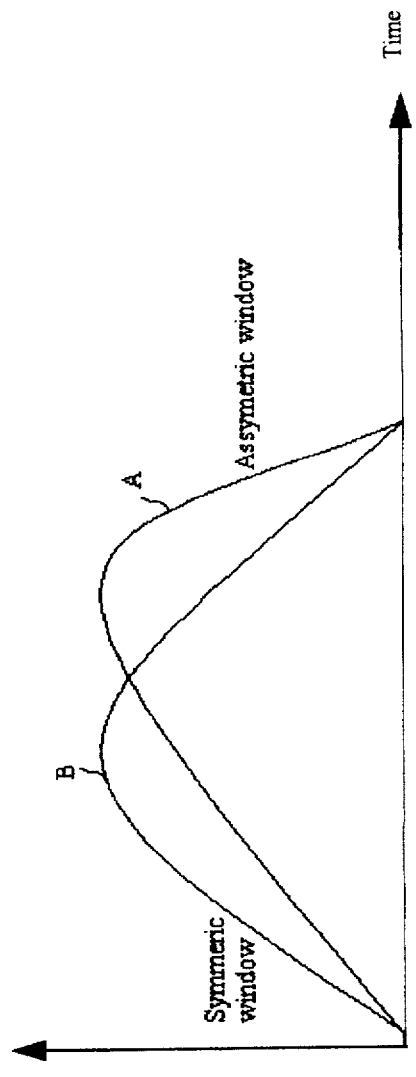

In changing the analysis window of FIG. 5A in this manner to end at the frame boundary, an asymmetric window could be applied in the encoding algorithm. Examples of such an optional asymmetric window is as shown in FIG. 6 and defined as:

$$w(n) = K \frac{nN - n^2}{\alpha N^2} \exp(-\alpha(N-n)/N)$$

for $0 \leq n \leq N$ and where K is the optional constant gain and N is the number of samples for all windows, and where $\alpha$ is a control parameter in designing the window.

When the typical linear prediction coefficient analysis is thus calculated, the resultant speech signal is typically multiplied by a symmetric or asymmetric window, such as the Hamming window. But in the case of the encoder 106, with its delay, the window could be modified to an asymmetric window with a center as close as possible to the frame boundary. The symmetric window is shown as 75 in FIG. 6, while the asymmetric window is shown at 77.

Thus, and as will be understood, the elimination of the popping and clicking disturbances in the rebroadcast signal follows by changing the encoder 106 in FIG. 4 to eliminate its look-ahead-buffer (i.e., look-ahead-buffer=0), such that the system 113, incorporating the decoder 104 and encoder 106 exhibit exactly equal delays as the frame delay at 108, i.e. only multiples of the frame size. Eliminating the look-ahead-buffer enables the system to operate quite well with the symmetrical window A of FIG. 6, although optimum performance is realized with the asymmetrical window B. Testing has shown that with these changes, the popping and clicking that are introduced into the rebroadcast speech of my U.S. Pat. No. 5,390,177 are eliminated, when switching from single active speaker to multiple active speakers. Overall system performance is then enhanced.

Figure 5B:
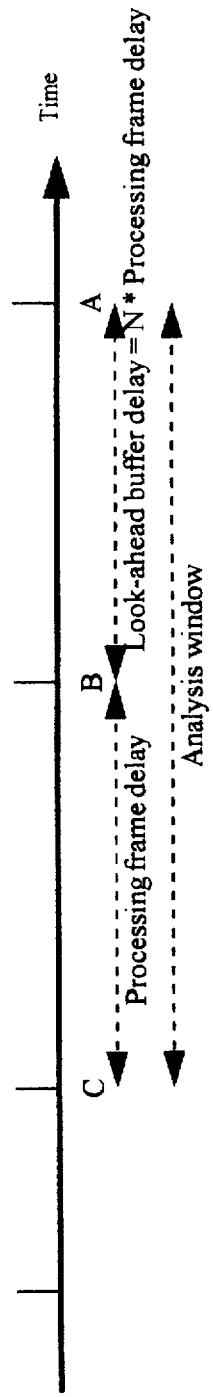

While there has been described what is considered to be a preferred embodiment of the present invention, it will be readily appreciated by those skilled in the art that modifications can be made without departing from the scope of the teachings herein of synchronizing and time matching the audio encoder delay and its relevant bit stream in a compressed audio conferencing system. Thus, whereas the invention has been described in a context where the audio encoder 106 is constructed to eliminate its look-ahead-buffer, it will be understood that the benefits of the invention will also follow if its look-ahead-buffer were modified to match, or be multiples, of the delay of the encoder frame size. In such way, the transition of the artifacts at the output of the audio decoder 111 will be minimized when the delay of this look-ahead-buffer equals an integral number of the signal frame delay. This is shown in FIG. 4 by the notation "look-ahead-buffer=multiples of frame delay". The coder delay of FIG. 2 then appears as in FIG. 5B. For at least such reason, therefore, resort should be had to the claims appended hereto for a true understanding of the scope of the invention.

I claim:

1. In a communications conferencing system employing an audio encoder having a look-ahead-buffer for converting audio information to a compressed digital signal for broadcast and employing an audio decoder for reconverting a broadcast compressed digital signal received to audio, apparatus comprising:

switching means operable in first or second positions to transmit compressed digital signal samples to be received by said audio decoder;

a first signal path coupled between said audio encoder and said first position of said switching means, and including a signal frame delay;

a second signal path coupled between said audio encoder and said second position of said switching means, and including a second audio decoder serially coupled with a second audio encoder; and wherein said second audio encoder differs from said audio encoder to minimize transition artifacts at the output of said audio decoder upon actuation of said switching means between said first and second positions.

2. The apparatus of claim 1 wherein said second audio encoder is devoid of any look-ahead-buffer.

3. The apparatus of claim 1 wherein said second audio encoder includes a look-ahead-buffer affording a delay equal to an integral number of said signal frame delay.

4. The apparatus of claim 1 wherein said second audio encoder is characterized by having an analysis window reflecting any difference in delay between said first and second signal paths.

* * * * *